United States Patent [19]
Nabi

[11] Patent Number: 5,402,990
[45] Date of Patent: Apr. 4, 1995

[54] STEEL MAKING PLANT

[76] Inventor: Ghulam Nabi, 220 Duncan Mills Road, North York, Ontario, Canada, M3B 3J5

[21] Appl. No.: 162,936

[22] Filed: Dec. 8, 1993

Related U.S. Application Data

[63] Continuation-in-part of Ser. No. 979,379, Nov. 19, 1992, Pat. No. 5,286,273, which is a continuation-in-part of Ser. No. 619,254, Nov. 23, 1990, abandoned.

[30] Foreign Application Priority Data

Jul. 14, 1990 [CA] Canada .................................. 2019050

[51] Int. Cl.[6] .......................................... C21B 13/12
[52] U.S. Cl. ....................................... 266/79; 266/87; 266/144; 266/145; 266/160
[58] Field of Search .................... 266/79, 87, 144, 145, 266/160

[56] References Cited

U.S. PATENT DOCUMENTS 4,805,880  2/1989  Hauk et al. ............................ 266/87
5,151,243  9/1992  Auer et al. ............................ 266/79

Primary Examiner—Melvyn J. Andrews
Attorney, Agent, or Firm—McFadden, Fincham

[57] ABSTRACT

This invention provides a method and appratus whereby steel of various compositions may be produced from iron ore and coal through a series of stages without the intermediate production of liquid iron. A reforming reactor receives top gases from the steel making reactors, and converts them to high reduction potential gases which are returned to the steel making reactors. The iron ore and reductants, such as coal, are charged to a controlled atmosphere reactor which may be an inclined rotary cylindrical shaft. From the controlled atmosphere reactor the charge is moved to a potential shift reactor which is inclined or vertical and encounters increasing heat and rising gases for converting the carbonised sponge into a semi-molten state. The charge then passes to a high temperature reactor where it encounters the reducing gases from the reforming reactor and preheated oxygen to create temperature in which steel is made. Hot gases from the high temperature reactor pass through the PSR and the CAR and are returned to the reforming reactors to complete the cycle.

14 Claims, 3 Drawing Sheets

STEEL MAKING PLANT

This application is a continuation-in-part application of U.S. Ser. No. 07/979,379, filed Nov. 19, 1992, now U.S. Pat. No. 5,286,273, which is a c-i-p of U.S. Ser. No. 07/619,254, filed Nov. 23, 1990, now abandoned.

FIELD OF THE INVENTION

This invention relates to a method and apparatus for a new steel making process. In particular, it relates to a process by which liquid steel of various compositions can be produced without the separate stage of hot iron production Furthermore, steel may be made from raw materials comprising iron ore and coal without the need to use coke, pellets or sinter.

BACKGROUND OF THE INVENTION

Steel has been manufactured for many years using variations of a conventional process in which iron ore and limestone are combined with coke and added continuously to a blast furnace where preheated air is added to facilitate combustion and create high heat. From the blast furnace, impurities are removed as slay and iron with a high carbon content is removed as molten metal. The molten iron is then further refined in a bessemer furnace, basic oxygen furnace, open hearth furnace or electric arc furnace (depending on the newness of the plant and the quality of steel required) where excess carbon is removed and additives which effect the quality of steel are combined with the molten iron. The molten steel is drawn off in batches and thereafter processed by rolling it into bars, pipes, plates, sheets, rails or structural shapes.

Although variations of this process are used to handle different types of ore or to produce different types of steel, the basic process has remained substantially unchanged for many years.

SUMMARY OF THE INVENTION

It is, therefore, the purpose of this invention to provide a method and apparatus whereby steel of various compositions may be produced from iron ore and coal, through a series of stages without the intermediate production of liquid iron.

It is also the purpose of this invention to provide a method and apparatus which is more efficient and contributes less to pollution because of it's ability to recycle hot gases and other by-products.

These objectives are achieved by using interrelated reactors. A reforming reactor (RR) which receives top gases from the steel making reactors, after dust removal and purification and converts them to high reduction potential gases which are returned to the steel making reactors to be burnt with preheated oxygen so as to produce the required intense heat and controlled reaction.

In the steel making portion of the plant, the iron ore and reductants, such as coal, are charged to a controlled atmosphere reactor (CAR) which may be an inclined, rotary, cylindrical shaft or a vertical shaft. From the CAR the charge moves into a hood or conduit which serves as a potential shift reactor (PSR) which may be an inclined or preferably vertical conduit where it encounters increasing heat from rising gases and a reduction atmosphere, thus converting the carbonised sponge iron into a semi-molten state.

The charge then passes into the high temperature reactor (HTR) which is similar to a basic oxygen furnace (BOF) where it encounters highly reducing gases from the reforming reactor (RR) and preheated oxygen to create a temperature in the order of 1,500 to 2,200 degrees C in which the steel is made and removed, either in batches or continuously.

The hot gases of the HTR rise and pass through the PSR and the CAR to provide heat. Any oxygen potential in the rising gases combine with carbon to provide additional heat and maintain the reduction atmosphere. The top gases from the top end of the CAR are cleaned and conveyed to the RR for conversion to create additional fuel to the HTR.

In particular, according to one embodiment of the invention, there is provided a process for making steel comprising the steps of introducing a charge comprising iron ore and coal into an inlet end of a controlled atmosphere reactor having an inlet end and an outlet end while injecting oxygen into the controlled atmosphere reactor near the inlet end, and passing the charge through the controlled atmosphere reactor to the outlet end thereof; discharging the charge through a sealed connection into an inlet end of a potential shift reactor having an inlet and outlet end and passing the charge through the potential shift reactor to the outlet end thereof; discharging the charge through a sealed connection from the outlet end of the potential shift reactor into a high temperature reactor in which steel is produced by combustion of reduction gases with oxygen; meanwhile causing gases produced in the high temperature reactor to flow, counter-current to the charge, from the high temperature reactor through the potential shift reactor and through the controlled atmosphere reactor to the inlet end thereof; regenerating the production gases at the inlet end of the controlled atmosphere reactor by reaction with the coal and iron ore of the charge, and the oxygen injected into the controlled atmosphere reactor, whereby the production gases are converted to a form mixture of $CO, H_2$, $CO_2$ and $H_2O$ at an elevated temperature and whereby iron ore is reduced at least from $Fe_2O_3$ to $Fe_3O_4$ at temperatures above 800° C. in the controlled atmosphere reactor.

In the above process, preferably the mixture of gases converted from the production gases are passed through the outlet end of the controlled atmosphere reactor to a heat recovery and purification system and in which the converted gases carry particles and volatiles, including sulphur.

Another preferred feature of the above process is where the regenerated gases from the controlled atmosphere reactor are passed through a heat exchanger to recover heat energy therefrom. In this respect, preferably the above process is one in which the regenerated gases from the controlled atmosphere reactor are passed through particle recovery means to obtain recovered particles. Still further, another preferred aspect of this process is where the recovered particles are recycled to an outlet region of the controlled atmosphere reactor.

In another alternative in the above process, preferably the recovered particles are treated to recover volatile metals. Still further, the above process preferably includes the step of recovering particles by passing the regenerated gases through water scrubbing means and wherein the recovered particles are recycled into the charge to the controlled atmosphere reactor.

Another embodiment of the above process includes a further step of passing the regenerated gases, after particles have been removed therefrom, through a second particle recovery means to remove any final trace amounts thereof, and in which the second particle recovery means comprises a dry or wet electrostatic precipitator.

In the above process, preferably there is provided a sulphur recovery means, and which includes the further step of passing the gases from the particle recovery means through the sulphur recovery means to remove sulphur.

Another embodiment of the above process is where the regenerated gases are passed through a reformer in a reforming process to produce heated reformer gases of $H_2$ and CO for use as the reduction gases in the high temperature reactor. Still further, another aspect of the process is where there is included the step of removing any $CO_2$ produced in the controlled atmosphere reactor.

In other preferred embodiments, the aforementioned reformer is one which includes means to combine the $CO_2$ with natural gas to produce $H_2$ and CO. Another preferred embodiment of the process includes the step of varying the respective amount of $H_2$ and CO relative to one another. In this latter type of embodiment, the process may include the step of varying the amount of $H_2$ and CO relative to one another, and which includes the further step of dividing the gaseous stream resulting from the particle recovery means and the sulphur recovery means into first and second streams, and wherein the first stream is treated to remove any $CO_2$ therein and provide a clean gas, and partially bleeding a portion of the clean gas to reduce any build-up of impurities therein, and recycling the resulting non-bled portion of the first stream as a recycled gaseous feed stream, and adding to the second stream a source of natural gas.

In still other options of the process, where the process utilizes first and second streams, such streams may be independent of one another, or are combined before the reforming process. In this latter type of embodiment, a portion of the reformer gases are introduced into the high temperature reactor to provide heat by reaction with $O_2$ introduced into the high temperature reactor and to provide conditions for smelting iron ore into steel.

In another preferred embodiment, the above process may be carried out where the temperature oof the reformer gases is adjusted by a process chosen from adding gaseous hydrocarbons or clean gases thereto. In a still further embodiment, the process may introduce a portion of the reformer gases into the potential shift reactor to provide reduction atmosphere to the charge. Still further, another option of the process involves the introduction of calcium into the high temperature reactor by entrainment in a stream of preheated oxygen.

In the process, the reformer gases may be introduced at a plurality of levels in the high temperature reactor. Likewise, steel making additives may be introduced directly into the high temperature reactor through sealed charging chambers.

The above process may be operated wherein the high temperature reactor has a gaseous phase, a slag phase, and a liquid metal phase, and in which the steel making additives may be introduced through the sealed charging means into one of the gaseous slag or liquid metal phase.

In the process of the present invention, heat is created in the high temperature reactor with a minimum use of oxygen by means of plasma jets to the preheat reformer gases upon introduction into the high temperature reactor. Still further, the potential shift reactor is adapted to provide a highly reducing atmosphere and lower temperature for the charge by introducing at least one of reformer gas, coal, natural gas, into the potential shift reactor.

In Applicant's process, there may be included the step of providing a reduction atmosphere to the charge by conveying the reduction gases flowing from the potential shift reactor to the controlled atmosphere reactor. In the process referred to above, optionally reduction gases in the controlled atmosphere reactor are combined with introduced oxygen, coal, and iron ore to produce regenerated gases.

In the optional feature of the process of the present invention, oxygen is injected into the controlled atmosphere reactor causes preheating of the charge by combustion. Still further, oxygen may be introduced into the controlled atmosphere reactor at a short distance from the inlet end of the controlled atmosphere reactor so that heat of combustion passes over the charge introduced at the inlet end of the controlled atmosphere reactor.

Preferably, the process is carried out where the charge is tumbled by providing the controlled atmosphere reactor with means to rotate. Still further, the process may include the additional step of monitoring reactions occurring in the controlled atmosphere reactor. In another aspect, the process of the present invention is one in which the controlled atmosphere reactor, the potential shift reactor, and the high temperature reactor are under pressure higher than the surrounding atmospheric pressure.

In the above embodiment, the charge which is introduced into the controlled atmosphere reactor is done under pressure by means of sealed charging chambers.

According to another embodiment of the invention, there is provided a steel making plant comprising a controlled atmosphere reactor, having an inlet end, adapted to receive a charge comprising iron ore and coal and to pass the charge through a heating and reducing atmosphere, the controlled atmosphere reactor having means to inject oxygen into the atmosphere; a potential shift reactor adapted to receive the charge from the controlled atmosphere reactor and pass it through an atmosphere of heat and reduction potential; a high temperature reactor adapted to receive the charge from the potential shift reactor and convert the charge into steel by the combustion of oxygen and reduction gases with the addition of steel making additives; connecting means between the high temperature reactor and the potential shift reactor and between the potential shift reactor and the controlled atmosphere reactor, connecting means being sealed from the atmosphere and adapted to move its gas as counter-current to the charge from the high temperature reactor to the potential shift reactor to the controlled atmosphere reactor; and gas reformer means adapted to receive counter-current from the controlled atmosphere reactor and to convert gases to $H_2$ and CO for delivery as fuel to the high temperature reactor.

A preferred feature of the above system is where the reformer includes at least one of: means to remove heat, means to remove particles, means to remove sulphur, means to remove $CO_2$, from the gases from the controlled atmosphere reactor. Still further, another preferred aspect of this apparatus includes means to convey reformer gas to the potential shift reactor.

In another alternative of the above system, preferably the high temperature reactor includes a pair of charging chambers in series to allow the addition of steel making additives while maintaining the system substantially closed to the surrounding environment.

Another embodiment of the above system may include means for supplying reformer reduction gases to each of the high temperature reactor and the potential shift reactor, and wherein the last mentioned means permits variable proportional supply of the reformer reduction gases to each of the reactors.

A still further feature of the above system is where the high temperature reactor includes tuyeres for permitting injection of oxygen into the high temperature reactor to permit heat generation therein. In the above system, preferably the high temperature reactor includes plasma jets for permitting injection of reduction gases into the high temperature reactor to permit heat generation therein.

In other options of the system, preferably the system includes means for permitting introduction into the potential shift reactor of at least one of reformer or natural gas and coal for enhancing reduction potential of the potential shift reactor. A still further aspect of the above system would be where the controlled atmosphere reactor includes sealed charging chambers to permit charging of the reactor without opening the reactor to the atmosphere.

Another preferred feature of the above system would be one in which the controlled atmosphere reactor and the potential shift reactor each include means to monitor and control the atmosphere and reactions contained therein.

According to yet another embodiment of the present invention, there is provided a steel making apparatus comprising: a controlled atmosphere reactor adapted to receive a charge comprising iron ore and reductants and to pass the charge through a heating and reducing atmosphere; a potential shift reactor comprising conduit means adapted to receive and maintain in contact the charge and the reductants from the controlled atmosphere reactor for passage through an atmosphere of increasing heat and reduction potential; a high temperature reactor adapted to receive the charge from the potential shift reactor and to treat the charge with reducing gases and preheated oxygen and added ingredients to make steel; control means for controlling the temperature and reduction potential of the reductants flowing through the potential shift reactor.

According to a still further embodiment of the present invention, there is provided a process for making steel comprising the steps of introducing a charge of productive gas and comprising iron ore and reductants into a controlled atmosphere reactor near an inlet end, and passing the charge through the controlled atmosphere reactor to an outlet end thereof; discharging the charge through a sealed connection into the inlet end of a potential shift reactor and passing the charge through the potential shift reactor to the outlet end thereof; discharging the charge through a sealed connection from the outlet end of the potential shift reactor into a high temperature reactor in which steel is produced by combustion of reduction gases with oxygen; meanwhile causing gases produced in the high temperature reactor to flow, counter-current to the charge, from the high temperature reactor through the potential shift reactor and through the controlled atmosphere reactor to the inlet end thereof; regenerating the production gases at the inlet end of the controlled atmosphere reactor by reaction with the reductants and iron ore of the charge, and the oxygen injected into the controlled atmosphere reactor; whereby the production gases are converted to a mixture of $H_2, H_2O, CO, CO_2$ and iron ore is at least partially reduced at an elevated temperature in the controlled atmosphere reactor.

Another preferred feature of the above process is where the mixture of gases converted from the production gases are passed through the outlet end of the controlled atmosphere reactor to a heat recovery and purification system and in which the converted gases carry particles and volatiles. Still further, another preferred aspect of this process is where the reductants charged to the controlled atmosphere reactor include coal.

Yet another embodiment of the invention is to provide a process for making steel comprising the steps of introducing a charge comprising iron ore and coal into an inlet end of a first stage while injecting oxygen into the first stage near the inlet end and passing the charge through the stage to an outlet end thereof; discharging the charge through a sealed connection into the inlet end of an intermediate stage and passing the charge through the intermediate stage to the outlet end thereof; discharging the charge through a sealed connection from the outlet end of the intermediate stage into a third stage in which steel is produced by combustion of reduction gases with oxygen; and passing gases produced in the third stage to flow from the third stage through the intermediate stage to the inlet of the first stage for contact with an incoming charge.

In the above process, preferably there is provided the further step of recycling at least a portion of the gases produced.

A further step of the above process is where the reformer gases, $CO_2$ and water are introduced into the liquid metal phase.

The invention may more easily be understood by a description of one embodiment thereof with reference to the attached drawings in which

DETAILED DESCRIPTION OF THE PREFERRED EMBODIMENTS

Figure 1A:
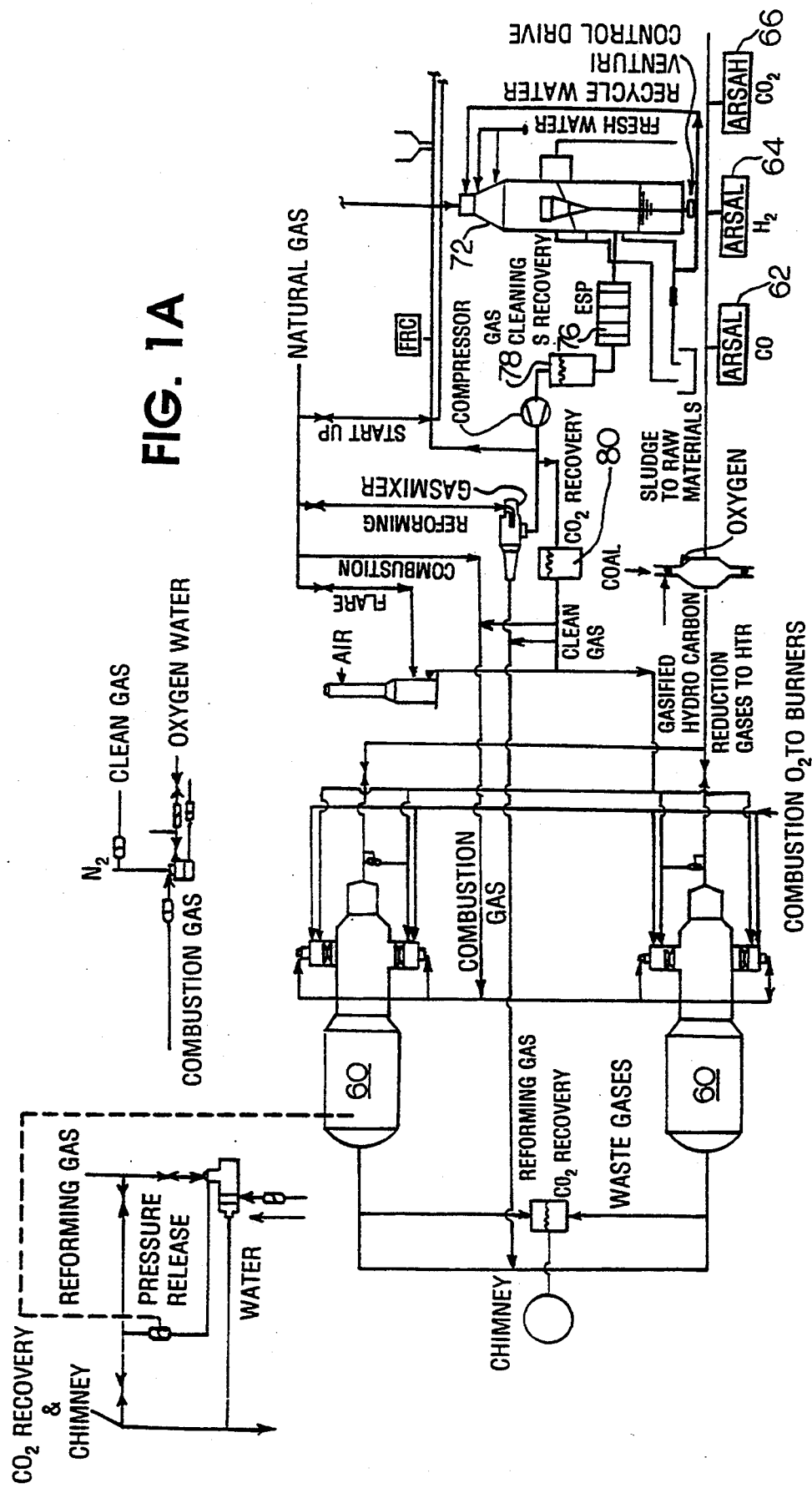
FIG. 1A is a schematic diagram of a steel making plant incorporating the principles of the present invention.
Figure 1B:
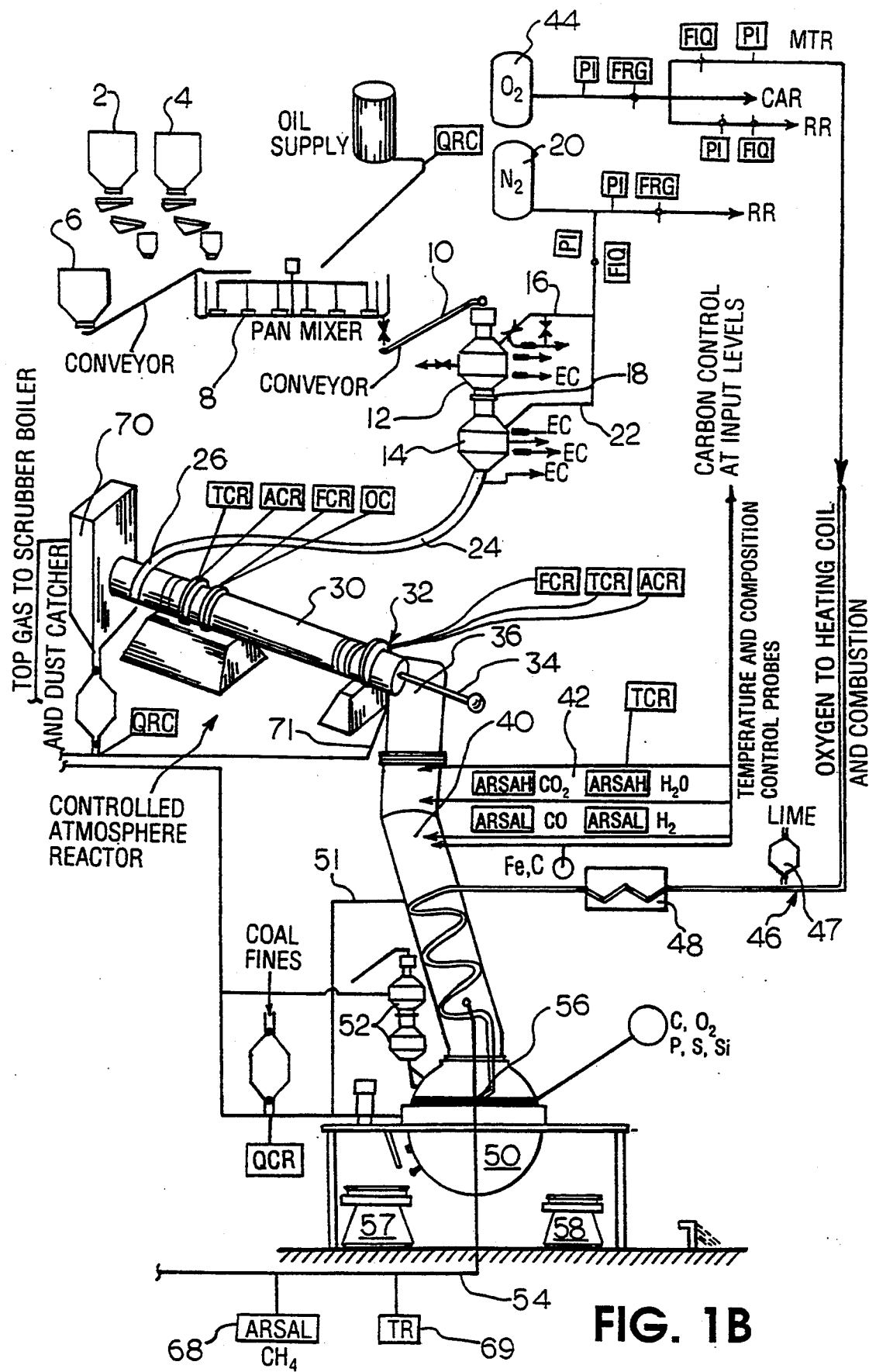
FIG. 1B is an enlarged, more detailed, schematic diagram of the reactor arrangement used in the present invention.

In the plant illustrated in FIG. 1B, the hopper 2 is provided to receive and discharge crushed or granular iron ore in the form of magnetite ($FE_3O_4$) or hematite ($FE_2O_3$) or any other economically exploitable iron ore. The hopper 4 is provided to receive and discharge granular or powdered coal to provide the basic reducing ingredient to the feed. The hopper 6 is provided to receive and discharge sludge containing principally iron ore particles and coal and liquid condensates of coal. It may also handle other constituents necessary to refine the process or determine the type of steel ultimately produced.

The contents of these hoppers are discharged to a pan mixer 8 which mixes the ingredients and provides to the conveyor 10 the basic charge to the reactors.

Figure 2:
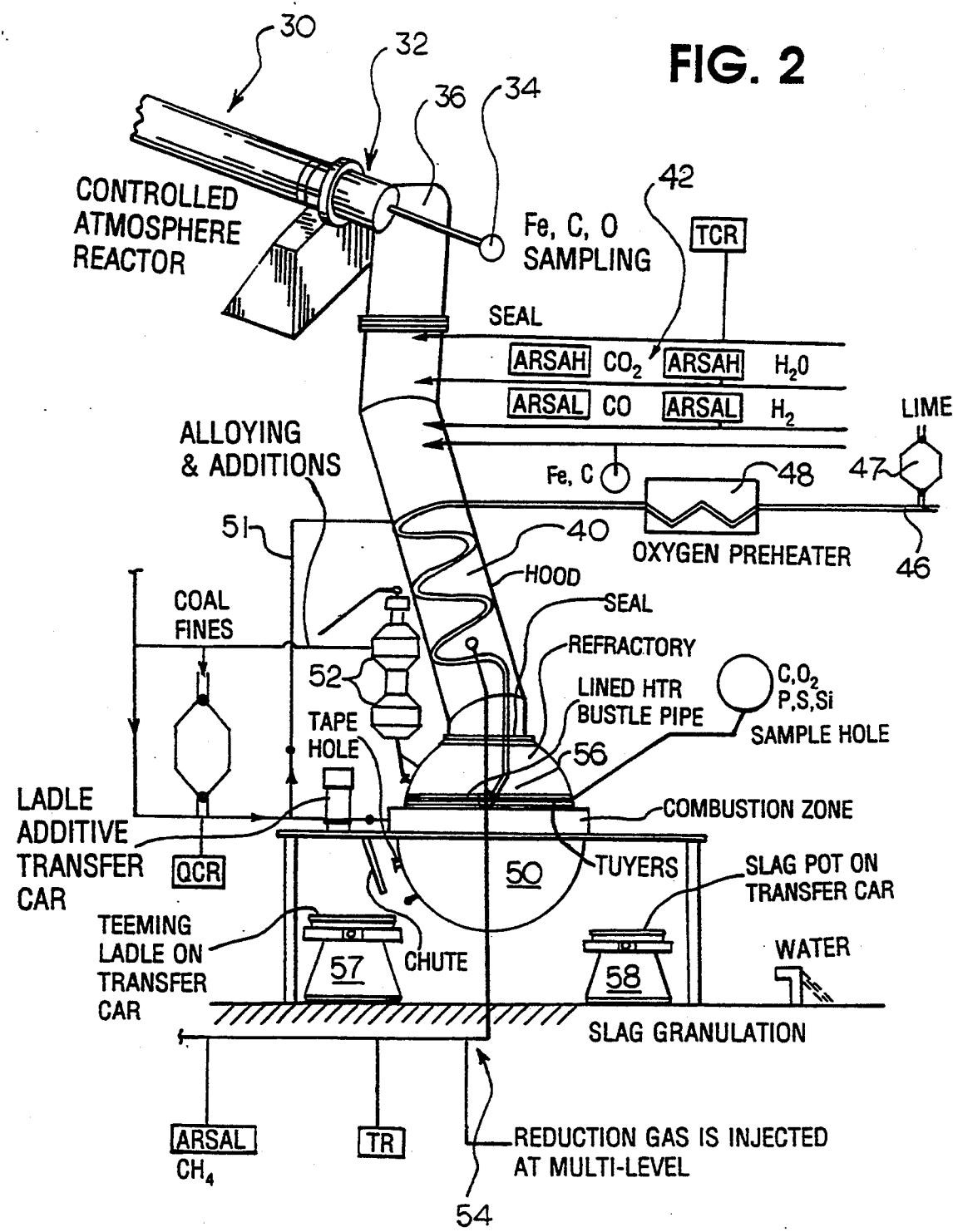
FIG. 2 is an enlarged, more detailed, schematic diagram of the steel making portions of the plant in FIG. 1B.

Referring to FIGS. 1B and 2, the conveyor 10 deposits the charge to a pair of sealed charging chambers 12 and 14 which are established in series and are capable of being sealed from the atmosphere to avoid escape of fumes from the reactors which will be discussed later. The upper chamber 12 is adapted to receive a charge of ore and other ingredients and has a purging line 16 which will convey nitrogen to eliminate fumes from the chamber which can be conveyed to a flare as indicated. A controllable seal is provided at 18 which will close to prevent the upward flow of gases from the lower chamber 14 and will open to allow the charge to travel down to the chamber 14. The chamber 14 is also connected with the source of nitrogen 20 by means of a line 22 to equalize pressure in chambers 12 and 14 before the sealed closure 18 is opened and to avoid pressure surges. A chute 24 is provided to allow the release of the charge from the lower chamber 14 into the upper inlet 26 of the controlled atmosphere reactor (CAR) 30.

In the embodiment illustrated, the CAR is a substantially horizontal but inclined, hollow, cylindrical drum, adapted to rotate about it's axis. The rotation and inclination of the drum causes the charge to tumble and process from the entrance 26 through the drum to the outlet end 32 while undergoing exposure to heat and the reducing atmosphere of the CAR.

As with the charging chambers, the CAR is provided with instruments to measure, analyze, record and control temperatures, flow rates and to activate alarms where necessary at various points in the reactor. The CAR may also be provided with a source of oxygen to provide additional heat to the charge at an early stage.

The charge reaches the outlet end 32 of the CAR at a red hot temperature of about 1,100 degrees C., depending on the type of ore, and is monitored by a sampling apparatus 34 to monitor the iron, oxygen and carbon contents.

To regulate the process and reaction in the CAR appropriate monitor and control devices will be required and these instruments are indicated in FIG. 1 by the symbols TCR (meaning temperature control and recording), ACR (meaning analysis control and recording of gases and coal input), FOR (meaning flow rate control and recording), O C (indicating oxygen input control).

At this point, the charge enters the hood 36 which is connected by means of seals to the end of the rotary drum and connectes by means of a seal 38 to a conduit 40 which leads to the high temperature reactor (HTR) 50. The conduit 40 acts as a potential shift reactor (PSR). It is lined with refractories and cooled by stave type coolers or by external means. It has an elaborate monitoring system to record and control the composition of rising gases and falling materials, temperature, carbon, $CO_2$, $H_2O$, CO, $H_2$, FE, C as indicated at 42 in the drawings.

These instruments are indicated by the symbols ARSAH (meaning analysis recording switch alarm high) for $CO_2$ and $H_2O$ and ARSAL (meaning analysis recording switch alarm low) for CO and $H_2$. At this point temperature control and recording is provided. A small open circle with Fe, C and O shows that on that line analysis is not performed.

Oxygen which is available from the source 44 can be conducted to the PSR by means of the line 46 which is provided with lime injection 47 and an oxygen preheater 48 before it is conducted to a coil structure within the high temperature zone of the PSR to further preheat the oxygen. In an alternative configuration, oxygen may be heated in an external furnace.

Gaseous hydrocarbons (natural gas) and coal fines may be introduced by the pipeline 51 (seen in FIG. 2) to balance or create more reducing potential as required, as indicated by the instrument QCR (indicating quantity control and recording).

The PSR conveys the charge to the high temperature reactor (HTR) 50 which is similar to a basic oxygen furnace. It comprises a vessel with a refractory lining and has means to tap or pour off the molten slag and the molten steel and a hole to draw steel samples for analysis.

The HTR is a more or less conventional reactor except that it may be modified to cope with the high temperatures which may be encountered in this process. These modifications might include the provision of internal cooling plates or external coils and the lining of the reactor may be acid or basic refractory material.

The HTR has a pair of charging chambers in series 52 to allow for the addition of solid and gaseous ingredients or alloying material in order to produce different types of steel. The sealed charging chambers allow the additives to be inserted into the HTR in the gaseous, slag, or liquid metal phase of the reactor while maintaining the system substantially closed to the atmosphere. The alloying materials may be in the form of particulate ores or pure substances.

The necessary heat and the reducing atmosphere of the HTR are provided by reducing gas conveyed by line 54 from the gas reforming reactors (RR) 60 which are shown only in FIG. 1. As in a basic oxygen furnace, the oxygen of combustion is provided through the line 46, preheated as mentioned above, to the HTR at the inlet 56 of which there are several spaced around the periphery of the vessel. The multiple inlets for reduction gases are kept separate from oxygen inlets.

Ideally, tuyers for the admission of reformed gas or oxygen may be of the water cooled plasma arc design. Iron oxides will be reduced to iron which, with alloys, will produce steel and silica will form slag with other ingredients.

Typical reactions in the HTR are represented by the following equations. The gaseous combustion reactions are similar to those given under reformer furnace.

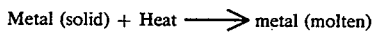

Metal (solid) + Heat $\longrightarrow$ metal (molten)

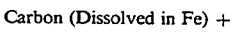

Carbon (Dissolved in Fe) +

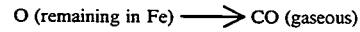

O (remaining in Fe) $\longrightarrow$ CO (gaseous)

The oxydizing conditions in the reactor plus CaO which can be inserted into the $O_2$ line 46 at 47 shown in FIG. 1, will remove phosphorous from the molten metal while reducing conditions and CaO additive will remove sulphur. Oxides such as NiO, MnO, $Cr_2O_3$, $V_2O_5$, will be directly reduced and combine with molten Fe to form alloys. Complex high melting ores like titaniferous magnetite can be treated in the reactor. Iron will go to the liquid metal phase leaving the titanium rich slag which can be separated for titanium recovery. As nitrogen is excluded from the furnace, titanium nitride will not be formed.

Because temperatures in excess of 1,600° C. can be achieved, reduction of highly stable oxides like MgO and CaO should be possible. A typical reaction in the formation of slag is represented by the following equation.

$$2(MgO.CaO) + [Si]_{FE} \rightarrow 2Mg_{(g)} + Ca_2SiO_4 \text{ (slag)}.$$

The actual slag composition depends upon the ore and coal composition, the lining of the furnace, and the working atmosphere in the HTR.

If the combustion production gases in the middle of the HTR have an oxidizing potential, then as they rise in the hood or PSR, they will meet with downward falling carbon and carbonized sponge so that the oxygen is first consumed producing higher temperatures but subsequently will lose heat in the counter falling sponge, iron, solid carbon and in chemical heat to the endothermic reaction, thus producing high reduction potential gases. When the HTR has a reduction atmosphere, the reduction potential of the rising gases will be further increased.

The hot gases of the HTR will rise through the PSR until they reach the outlet end 32 of the CAR where they will encounter hot iron oxides, at which point most of the oxygen in the rising gases will have been consumed. As they rise through the CAR the CO will combine with the ore to form some native iron and carbon dioxide while hydrogen will combine with oxygen to form iron and vapour. Typical reactions in the CAR may be described as follows;

At the outlet end;
$FeO + CO = Fe + CO_2$
$FeO + H_2 = Fe + H_2O$
$CO_2 + C = 2CO$
$H_2O + C = CO + H_2$
$Fe + C = Fe(C)$ Carbon dissolved in sponge iron
$FeO + Fe(C) = Fe + CO$ In the middle region;
$Fe_3O_4 + CO = 3FeO + CO_2$
$Fe_3O_4 + H_2 = 3FeO + H_2O$
$CO_2 + C = 2CO$
$H_2O + C = CO + H_2$ In the upstream end;
$3Fe_2O_3 + CO = 2Fe_3O_4 + CO_2$
$3Fe_2O_3 + H_2 = 2Fe_3O_4 + H_2O$
$3O_2 + 4C = 2CO + 2CO_2$
$CO_2 + H_2 = CO + H_2O$ The gases travel up the inclined rotary drum of the CAR in counter current relationship to the ore and coal mixture, but because the charge is delivered to the CAR by a sealed chamber system, the gases will reach the upper end of the CAR at a temperature in the order of 600–800 degrees C.

The "top gas" is treated in a cyclone apparatus (which includes a heat exchanger to recover heat energy which can be used in steam electric generation) 70 to remove dust, which includes iron ore, coal and gasified metals (which are recycled to the CAR by line 71 in FIG. 1) or the dust can be treated for the recovery of volatile metals if economically feasible. The gas is then conveyed to a gas scrubber 72 where it is treated with a water spray to remove any additional dust which is collected as sludge in the settling tank 74 and eventually returned to the hopper 6. The gas is then processed through an electro-static precipitator 76, a sulphur recovery apparatus 78, and a $CO_2$ recovery apparatus 80.

The clean gas is then conveyed to one of a pair of gas reforming reactors 60 shown only in FIG. 1.

It should be realized that some of the gas will be used and combined with natural gas to heat the reforming reactors, or if necessary, the gas may be conveyed to an emergency flare. The other part of the gas which is not freed of $CO_2$ can be used in the reforming reactor with natural gas. Reformer Reactor can be a single unit tubular reformer or multiple units working in sequence as shown in the present embodiment.

In the reforming reactors, natural gas reacts with carbon dioxide and water vapours to produce high temperature, high reduction potential gases. This reforming reaction is carried on at 700–1,500 degrees C., the temperature of the exit gases being adjusted to 600–1,200 degrees C. This is done by mixing clean gas or gasified hydro carbon in the exit pipe of the high temperature reformed gas. The reformed gas is then conveyed by means of line 54 where it is used in controlled quantities as part of the fuel and reducing gas in the HTR 50.

Typical reactions in the RR are represented by the following equations:

$$C_nH_m + nCO_2 = 2nCO + m/2H_2$$

$$C_nH_m + nH_2O = nCO + (n + m/2)H_2$$

$$C_nH_m + n/2O_2 = nCO + m/2H_2$$

$$CO + \tfrac{1}{2}O_2 = CO_2$$

$$H_2 + \tfrac{1}{2}O_2 = H_2O$$

$$2CO = CO_2 + C$$

$$H_2 + CO = H_2O + C$$

$$CO_2 + H_2 = CO + H_2O$$

The extent of any reaction and the direction of these reactions depends on the thermo dynamics, kinetics and catalysts employed but the main product of the reforming reactors will be CO and $H_2$ with some $CO_2$, $H_2O$ and $CH_4$ left over.

In the reformer, heat is created in the reformer furnace as represented by the following reaction equations;

$$C_nH_m + (n + m/4)O_2 \rightarrow nCO_2 + m/2H_2O$$

$$CO + \tfrac{1}{2}O_2 = CO_2$$

$$H_2 + \tfrac{1}{2}O_2 = H_2O$$

As seen in FIG. 1, the output of the reforming reactors is provided with the necessary controls 62, 64, 66, 68 and 69 to monitor CO, $H_2$, $CO_2$, $CH_4$ and temperature.

Thus, by means of the present invention, a steel plant may be constructed in which various types of iron ore are charged to the reactors with a controlled and variable amount of coal and other ingredients so that they are exposed to a controlled atmosphere reactor, a potential shift reactor and a high temperature reactor in continuous sequence and result in the desired steel product while gases from the reforming reactors are added to oxygen, which is pre-heated with other ingredients such as lime to the high temperature reactor and travel upwards through the PSR to the CAR to cause the heating and reduction of the incoming charge. The top gases from the CAR are then recycled through dust cleaners, precipitators, sulphur recovery, $CO_2$ recovery and are passed through the RR to regenerate with the addition of variable and controlled amounts of natural gas, coal, oxygen, etc. to form the fuel of the high temperature reactor.

The four reactors referred to are intended to provide a closed loop substantially sealed system and it is contemplated that the pressures within the system will be positive and will amount to approximately four to five atmospheres in the reformers and the reformed gas and oxygen feed to the high temperature furnace, approximately three atmospheres in the PSR and approximately two to three atmospheres in the CAR.

Of course, it will be realized that variations and modifications of the illustrated embodiment might be employed without departing from the inventive concept herein.

I claim:

1. A steel making plant comprising:
   a controlled atmosphere reactor, having an inlet end, adapted to receive a charge comprising iron ore and coal and to pass said charge through a heating and reducing atmosphere;
   said controlled atmosphere reactor having means to inject oxygen into said controlled atmosphere reactor;
   a potential shift reactor adapted to receive the charge from said controlled atmosphere reactor and pass said charge through an atmosphere of heat and reducing potential;
   a high temperature reactor adapted to receive the charge from said potential shift reactor and convert said charge into steel by the combustion of oxygen and reduction gases with the addition of steel making additives;
   connecting means between said high temperature reactor and said potential shift reactor and between said potential shift reactor and said controlled atmosphere reactor, connecting means being sealed from the atmosphere and adapted to move gases from said high temperature reactor as counter-current to the charge from the high temperature reactor to the potential shift reactor to the controlled atmosphere reactor;
   gas reformer means adapted to receive counter-current from said controlled atmosphere reactor and to convert gases to $H_2$ and CO for delivery as fuel to the high temperature reactor.

2. A steel making plant as claimed in claim 1, in which said reformer includes at least one of: means to remove heat, means to remove particles, means to remove sulphur, means to remove $CO_2$, from said gases from the controlled atmosphere reactor.

3. A steel making plant as claimed in claim 1, including means to convey reformer gas to said potential shift reactor.

4. A steel making plant as claimed in claim 1, in which said high temperature reactor includes a pair of charging chambers in series to allow the addition of steel making additives while maintaining the system substantially closed to the surrounding environment.

5. A steel making plant as claimed in claim 1, including means for supplying reformer reduction gases to each of said high temperature reactor and said potential shift reactor, and wherein said means for supplying reformer reduction gases permits variable proportional supply of said reformer reduction gases to each of said reactors.

6. A steel making plant as claimed in claim 1, wherein said high temperature reactor includes tuyeres for permitting injection of oxygen into said high temperature reactor to permit heat generation therein.

7. A steel making plant as claimed in claim 1, wherein said high temperature reactor includes plasma jets for permitting injection of reduction gases into said high temperature reactor to permit heat generation therein.

8. A steel making plant as claimed in claim 1, including means for permitting introduction into said potential shift reactor of at least one of reformer or natural gas and coal for enhancing reduction potential of said potential shift reactor.

9. A steel making plant as claimed in claim 4, in which said controlled atmosphere reactor includes sealed charging chambers to permit charging of the reactor without opening the reactor to the atmosphere.

10. A steel making plant as claimed in claim 1, in which said controlled atmosphere reactor and said potential shift reactor each include means to monitor and control the atmosphere and reactions contained therein.

11. A steel making apparatus comprising:
    a controlled atmosphere reactor adapted to receive a charge comprising iron ore and reductants and to pass said charge through a heating and reducing atmosphere;
    a potential shift reactor comprising conduit means adapted to receive and maintain in contact said charge and said reductants from said controlled atmosphere reactor for passage through an atmosphere of increasing heat and reduction potential;
    a high temperature reactor adapted to receive the charge from the potential shift reactor and to treat said charge with reducing gases and preheated oxygen and added ingredients to make steel;
    control means for controlling the temperature and reduction potential of the reductants flowing through said potential shift reactor.

12. A plant as claimed in claim 1, in which the a controlled atmosphere a reactor for reducing the ore includes rotating and stationary parts, said parts including pressure tight means therebetween.

13. A plant as claimed in claim 1, said plant including a potential shift reactor with means for the introduction of reduction gases, means for the introduction of gaseous or solid reductants.

14. A plant as claimed in claim 1, wherein said high temperature reactor includes:
    first tuyere means for introduction of reduction gases at various levels;
    means for discharging liquid metal from said high temperature reactor;
    means for discharging metal and slag;
    means for sampling liquid metal or slag;
    second tuyere means for introducing gases in the gaseous phase of the reactor and in the liquid phase of the reactor;
    plasma tuyeres.

* * * * *